(12) United States Patent
Warfen et al.

(10) Patent No.: US 11,549,488 B2
(45) Date of Patent: Jan. 10, 2023

(54) METHOD AND CONTROLLER FOR OPERATING A WIND TURBINE

(71) Applicant: SIEMENS GAMESA RENEWABLE ENERGY SERVICE GMBH, Hamburg (DE)

(72) Inventors: Karsten Warfen, Weede/Söhren (DE); Timo Gosch-Pleß, Osterrönfeld (DE)

(73) Assignee: Siemens Gamesa Renewable Energy Service GmbH, Hamburg (DE)

(*) Notice: Subject to any disclaimer, the term of this patent is extended or adjusted under 35 U.S.C. 154(b) by 0 days.

(21) Appl. No.: 17/255,536

(22) PCT Filed: Jun. 17, 2019

(86) PCT No.: PCT/EP2019/065819
§ 371 (c)(1),
(2) Date: Dec. 23, 2020

(87) PCT Pub. No.: WO2020/002014
PCT Pub. Date: Jan. 2, 2020

(65) Prior Publication Data
US 2021/0285419 A1    Sep. 16, 2021

(30) Foreign Application Priority Data
Jun. 28, 2018    (DE) .......................... 102018005134.0

(51) Int. Cl.
*F03D 9/00*    (2016.01)
*H02P 9/04*    (2006.01)
(Continued)

(52) U.S. Cl.
CPC ......... *F03D 7/0296* (2013.01); *F03D 7/0224* (2013.01); *F03D 7/0244* (2013.01);
(Continued)

(58) Field of Classification Search
CPC .... F03D 7/0224; F03D 7/0244; F03D 7/0264; F03D 7/0296; F03D 9/11; F03D 9/255;
(Continued)

(56) References Cited

U.S. PATENT DOCUMENTS 8,008,797 B2 * 8/2011 Simon ....................... H02P 9/06
290/55
9,261,080 B2 * 2/2016 Egedal .................. F03D 7/0224
(Continued)

FOREIGN PATENT DOCUMENTS

DE    102006054666    5/2008
DE    102015004393    10/2016
(Continued)

OTHER PUBLICATIONS

Official Action for German Patent Application No. 102018005134.0, dated Apr. 17, 2019, 7 pages.
(Continued)

*Primary Examiner* — Tulsidas C Patel
*Assistant Examiner* — Thomas K Quigley
(74) *Attorney, Agent, or Firm* — Sheridan Ross P.C.

(57) ABSTRACT

The method according to the invention for operating a wind turbine, comprising a tower and a rotor arranged at the top of the tower and having at least one rotor blade, which can be adjusted about a blade setting axis, has a first operating mode in which the at least one rotor blade has an operating angular position about the blade setting axis and a wind-force-dependent rotation of the rotor is converted into electrical power using a generator unit, which power is delivered from the wind turbine into an electrical network and/or stored, and a second operating mode in which the at least one rotor blade is adjusted by at least 60° and/or max. 110° about the blade setting axis relative to the operating angular position into a damping angular position, and a counter
(Continued)

Figure 1:
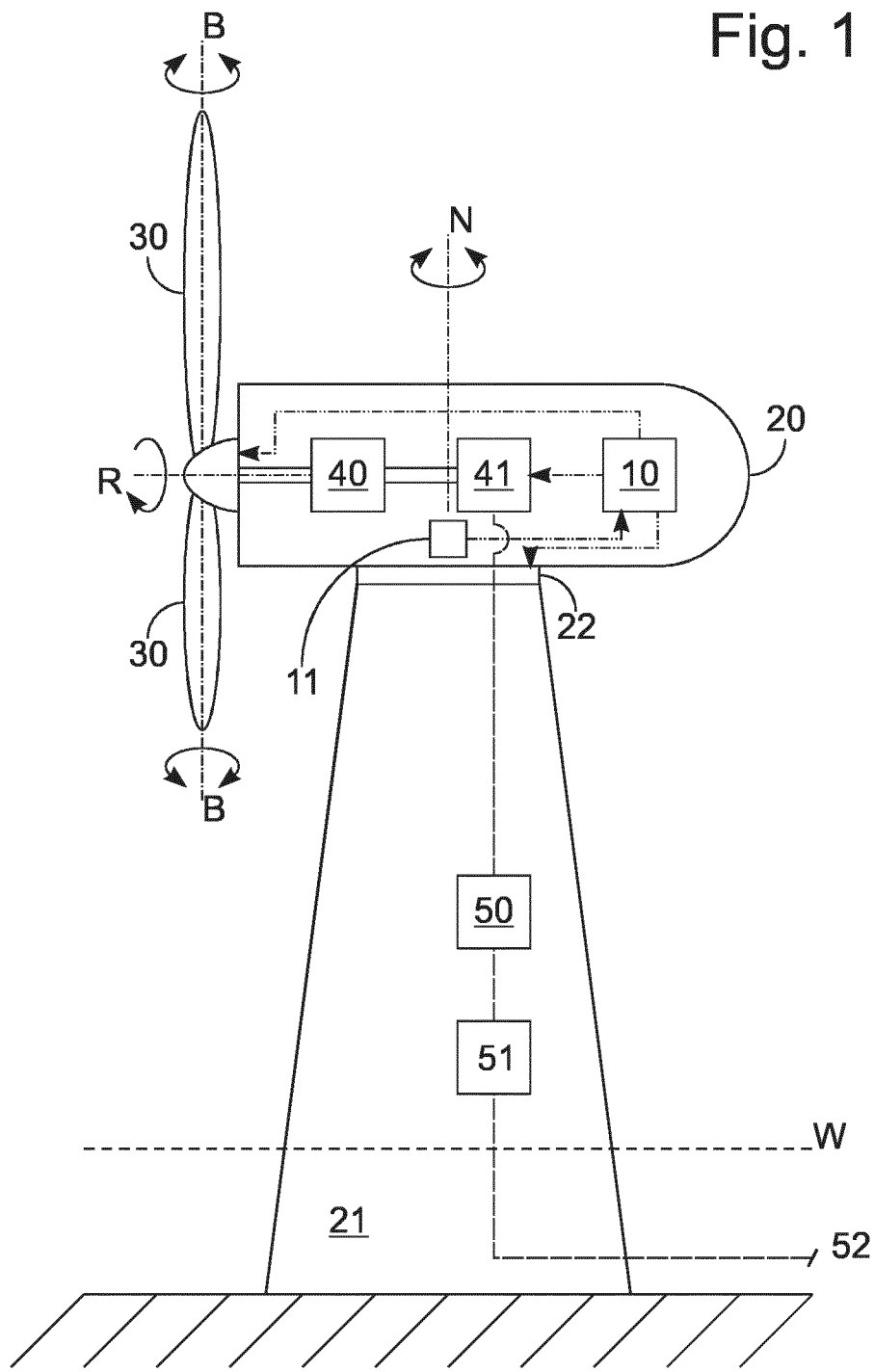

torque braking the rotor is controlled based on a vibration of the tower.

17 Claims, 1 Drawing Sheet

(51) Int. Cl.
  *F03D 7/02* (2006.01)
  *F03D 9/11* (2016.01)
  *F03D 9/25* (2016.01)
  *H02P 9/00* (2006.01)
  *H02P 101/15* (2016.01)
(52) U.S. Cl.
  CPC .............. *F03D 7/0264* (2013.01); *F03D 9/11* (2016.05); *F03D 9/255* (2017.02); *H02P 9/008* (2013.01); *F05B 2240/912* (2013.01); *F05B 2270/334* (2013.01); *H02P 2101/15* (2015.01)
(58) Field of Classification Search
  CPC .................. H02P 9/008; H02P 2101/15; F05B 2240/912; F05B 2270/334
  See application file for complete search history.

(56) References Cited

U.S. PATENT DOCUMENTS

| | | | | |
|---|---|---|---|---|
| 9,644,606 | B2* | 5/2017 | Agarwal | ............... F03D 7/0224 |
| 10,024,303 | B2* | 7/2018 | Wakasa | ................ F03D 7/0244 |
| 10,087,913 | B2* | 10/2018 | Nielsen | ................ F03D 7/0204 |
| 10,480,486 | B2* | 11/2019 | Brodsgaard | ........... F03D 7/0224 |
| 10,975,841 | B2* | 4/2021 | Beckerman | ........... F03D 7/0276 |
| 2005/0200061 | A1* | 9/2005 | Nemoto | ................ B60W 30/20 267/140.14 |
| 2008/0260514 | A1 | 10/2008 | Nielsen et al. | |
| 2008/0263731 | A1* | 10/2008 | Tabe | .......................... F03D 9/11 903/905 |
| 2008/0308375 | A1* | 12/2008 | Heeke | ..................... F16H 45/02 903/914 |
| 2009/0184519 | A1* | 7/2009 | Nies | ......................... F03D 7/024 290/44 |
| 2010/0133823 | A1* | 6/2010 | Schramm | ............... F03D 7/0248 416/169 R |
| 2010/0207396 | A1* | 8/2010 | Simon | ....................... H02P 9/06 290/55 |
| 2011/0101696 | A1* | 5/2011 | Holle | ...................... F01D 5/225 290/53 |
| 2012/0001439 | A1* | 1/2012 | Simon | ....................... H02P 9/06 290/55 |
| 2014/0339827 | A1 | 11/2014 | Esbensen et al. | |
| 2015/0361957 | A1* | 12/2015 | Agarwal | ............... F03D 7/0272 290/44 |
| 2018/0066630 | A1 | 3/2018 | Kristoffersen | |
| 2018/0128243 | A1 | 5/2018 | Deng et al. | |

FOREIGN PATENT DOCUMENTS

| | | |
|---|---|---|
| EP | 2306005 | 4/2011 |
| EP | 2620639 | 7/2013 |
| WO | WO 2015/074664 | 5/2015 |
| WO | WO 2015/086023 | 6/2015 |
| WO | WO 2017/201460 | 11/2017 |
| WO | WO 2018/077530 | 5/2018 |

OTHER PUBLICATIONS

English Translation of the International Search Report for International (PCT) Patent Application No. PCT/EP2019/065819, dated Sep. 10, 2019, 3 pages.

International Search Report and Written Opinion for International (PCT) Patent Application No. PT/EP2019/065819, dated Sep. 10, 2019, 9 pages.

* cited by examiner

METHOD AND CONTROLLER FOR OPERATING A WIND TURBINE

CROSS REFERENCE TO RELATED APPLICATIONS

This application is a national stage application under 35 U.S.C. 371 and claims the benefit of PCT Application No. PCT/EP2019/065819 having an international filing date of 17 Jun. 2019, which designated the United States, which PCT application claimed the benefit of German Patent Application No. 102018005134.0 filed 28 Jun. 2018, the disclosures of each of which are incorporated herein by reference in their entireties.

The present invention relates to a method and a controller for operating a wind turbine, a wind turbine comprising the controller, as well as a computer program product for implementing the method.

A method for operating a wind turbine is known from DE 10 2015 004 393 A1 in which at least one process variable representing the transverse vibration of a wind turbine tower is detected, a gain factor is determined on the basis of a vibration intensity determinable from the at least one process variable, a control variable is determined on the basis of said gain factor and the at least one process variable, and a reaction moment referred to as a roll moment of a drive train comprising a rotor, generator and gearbox as applicable is influenced on the basis of the determined control variable.

Because the roll moment is supported at the top of the tower, influencing it can change a supporting force acting on the top of the tower and thereby dampen a lateral vibration of the tower in the transverse direction in terms of control.

The object of the present invention is to improve a wind turbine or its operation, respectively.

This task is solved by a method having the features of claim 1. Claims 8-10 protect a controller or respectively a computer program product for implementing a method as described herein or a wind turbine having a controller as described herein. The dependent claims relate to advantageous further developments.

According to one embodiment of the present invention, a wind turbine comprises a tower and a rotor having at least one rotor blade adjustable about a blade setting axis arranged at the tower top, in one embodiment a nacelle.

The tower is arranged in one embodiment in a body of water; in a further development, off of a coastline ("offshore").

The present invention can be used to particular advantage in the case of such wind turbines, particularly due to the vibrational excitations from the water, in particular wave loads, without being limited thereto.

The rotor, or the top of the tower respectively, thus in particular the nacelle, is in one embodiment adjusted about a tracking axis transverse to its rotational axis relative to a tower body, in particular in a wind direction tracking manner, in a further development with the aid of a drive, in particular an electric and/or a hydraulic drive, or the wind turbine is configured for this purpose or, respectively, in a corresponding manner.

Additionally or alternatively, the rotational axis in one embodiment forms an angle of at least 60°, in particular at least 70°, in one embodiment at least 75° and/or a maximum of 120°, in particular a maximum of 110°, in one embodiment a maximum of 105°, with the direction of gravity, thus in one embodiment it is at least substantially horizontal.

Additionally or alternatively, the tracking axis in one embodiment forms an angle of at least 30°, in particular a maximum of 20°, in one embodiment a maximum of 10°, with the direction of gravity, thus in one embodiment it is at least substantially vertical.

Additionally or alternatively, the rotor in one embodiment comprises at least two and/or at most five, in a further development exactly three, rotor blades, each of which can be adjusted about a blade setting axis, in one embodiment separately or individually; in another embodiment together or synchronously, in one embodiment (each) with the aid of a drive, in particular an electric and/or hydraulic drive. In another embodiment, the rotor has only (exactly) one rotor blade.

In each case, wind can thereby be converted particularly advantageously into electrical energy, in particular when two or more of these features or embodiments are combined.

According to one embodiment of the present invention, a method for operating the wind turbine comprises a first operating mode in which the rotor blade, or respectively one or more, preferably all of the rotor blades of the rotor (each) exhibit an operating angular position, in one embodiment the same operating angular position, about the (respective) blade setting axis, and wind force-dependent or respectively wind-induced rotation of the rotor is converted with the aid of a generator unit into electrical energy or power, which is transferred from the wind turbine to an electrical network and/or is stored.

In one embodiment, the generator unit comprises at least one generator which can be or respectively is (rotationally) coupled to the rotor and/or is arranged at the top of the tower, thus in particular the nacelle. In one embodiment, the generator unit comprises a converter system by means of which the generator torque can advantageously be freely adjusted within a wide range.

In a further development, the generator can be or respectively is coupled to the rotor by at least one gearbox of the generator unit, which in one embodiment translates a rotational speed of the rotor into high(er) speed.

In one embodiment, wind can thereby be converted into electrical energy in a particularly advantageous manner.

Similarly, the wind turbine can also comprise a gearless generator unit, or can respectively convert a rotation of the rotor into electrical energy or power gearlessly or can respectively be configured for this purpose.

The wind turbine is thereby advantageously able to exhibit fewer (rapidly) rotating parts and thus less wear.

In one embodiment, the first operating mode is a partial load mode, which in one embodiment is effected at wind speeds ranging from about 4 to about 12 m/s, or above a cut-in (wind) speed and below a rated (wind) speed, respectively.

In one embodiment, the (respective) rotor blade correspondingly exhibits a so-called pitch angle, or blade pitch angle respectively, of at least substantially 0° about its blade setting axis in the/its operating angular position, in particular a fine pitch or respectively optimal blade pitch angle at optimal rotor tip speed ratio, which is equal to the quotient of the product of the rotor speed and the length of the rotor blade from the rotational axis to the blade tip divided by the wind speed, wherein the optimal blade pitch angle and optimal tip speed ratio are each defined by or respectively at the maximum rotor output at a stipulated wind speed, thus the maximum power coefficient.

According to one embodiment of the present invention, (at least) one second operating mode is now provided in which the rotor blade or respectively one or more, preferably all of the rotor blades of the rotor is/are, in particular are to be (each) adjusted or rotated by at least 60°, in particular at least 70°, in one embodiment at least 80°, and/or at most 110°, in particular a maximum of 100°, in one embodiment a maximum of 95°, particularly preferably at least 84° and/or at most 94°, about the (respective) blade setting axis relative to the operating angular position into a, in one embodiment the same, damping angular position, and a counter torque braking the rotor, in particular in a drive train comprising the rotor and gear mechanism, is controlled, in particular modulated, on the basis of, or respectively as a function of, a vibration of the tower, in particular to reduce said vibration or respectively in such manner, or subject to the requirement, to reduce said tower vibration.

As explained in the introduction in respect of DE 10 2015 004 393 A1, a wind force-dependent torque on the rotor ("aerodynamic moment" or "rotor torque" respectively) and a counter torque counteracting same, or braking the rotor respectively, effects a supporting force on the top of the tower so that by controlling the counter torque, and thus the supporting force, a vibration of the tower can be reduced or respectively dampened in terms of control. Reference is additionally made to the disclosure of DE 10 2015 004 393 A1, in particular the controller structure or respectively technical control implementation disclosed therein, and same is fully incorporated into the present disclosure without the present control being limited thereto.

Thus, one embodiment of the present invention is based on the idea of realizing a control-related vibration damping in one operating mode in which the rotor blade or blades exhibit an approximate feathering position in which the rotor converts an inflow of wind parallel to its rotational axis into a minimum rotational speed.

Such a feathering position is usually set either at wind speeds below a cut-in wind speed, which is usually in the range of 4 m/s, and/or wind speeds above a cut-out speed, usually in the range of 25 m/s. Thus, in one embodiment, the feathering position of a rotor blade, in which the rotor converts an inflow of wind parallel to its rotational axis into a minimum torque, is rotated by at least 80° and/or at most 100°, preferably by 90°, versus the operating angular position of the rotor blade, which, in one embodiment, can thus also be defined by this. In the second operating mode, the rotor blade or blades in one embodiment is/are or respectively are to be (in each case) adjusted or respectively rotated from the/their operating angular position toward the/their feathering position into the/their damping angular position. In other words, in one embodiment, the (upwind or respectively windward) leading edge of the (respective) rotor blade is rotated out of the operating angular position (in)to the oncoming (wind) flow in the second operating mode.

Thus, according to one embodiment of the present invention, a vibration of the tower can be advantageously reduced or respectively dampened in terms of control (even) at wind speeds below the cut-in wind speed, in particular thus with stationary or spinning rotor, and/or above the cut-out speed at which the rotor blade or blades exhibit an approximate feathering position.

Correspondingly, a switch is made from the first into the second operating mode in one embodiment should a wind speed exceed an, in particular preset, in one embodiment adjustable, cut-out (wind) speed of the wind turbine or same is detected, in particular detected or predicted by sensors, respectively. In one embodiment, the cut-out (wind) speed amounts to at least 20 m/s, in particular at least 23 m/s, and/or a maximum of 35 m/s, in particular a maximum of 27 m/s. In one embodiment, a full-load operation or grid infeed, or an output of electrical power to the electrical network respectively, is ended should a wind speed exceed the cut-out (wind) speed or same is detected, in particular detected or predicted by sensors respectively, in particular the cut-out (wind) speed can be defined in such a way that, at such wind speeds, full-load operation or grid infeed is ended.

Additionally or alternatively, a switch is made from the first into the second operating mode in one embodiment should an, in particular (pre)defined, malfunction be detected.

In one embodiment, the ((pre)defined) malfunction can be a failure of the wind turbine, in particular a malfunction of its rotor blade adjustment, an exceeding of a permissible operating temperature in a component or a fluid of the wind turbine or another malfunction of the wind turbine which does not permit a normal (output) operation of the wind turbine, or, respectively, a ((pre)defined) malfunction can be detected should such a failure be detected.

Additionally or alternatively, the ((pre)defined) malfunction can in one embodiment be a failure in a or respectively the electrical network to, or respectively into, which the wind turbine delivers electrical power, or, respectively, a ((pre)defined) malfunction can be detected should such a failure be detected. In this context, the term failure in particular encompasses a shutdown due to limited grid infeed capacities.

Additionally or alternatively, the ((pre)defined) malfunction can in one embodiment be a failure in a storage device into which the wind turbine stores electrical power, or, respectively, a ((pre)defined) malfunction can be detected should such a failure be detected.

Thus, one embodiment of the present invention is based on the idea of realizing a control-related vibration damping upon a malfunction, whereby the rotor blade or blades exhibit an approximate feathering position, and the risk of damage is thus (further) minimized.

In one embodiment, the counter torque braking the rotor is controlled with the aid of the generator unit, in a further development by the braking counter torque being controlled such that, or by the braking counter torque being controlled subject to the requirement that, or by the braking counter torque being modulated in particular in term of amplitude, phase and/or frequency that, a supporting force imparted by the counter torque at the top of the tower counteracts, or reduces or dampens respectively, the vibration to be reduced or respectively dampened, in one embodiment as explained above with reference to DE 10 2015 004 393 A1. In a very simple example, upon a (detected) vibration of the tower in one direction, the counter torque can be controlled with the aid of the generator unit such that the supporting force thereby imparted at the top of the tower acts in the opposite direction thereto, whereby the amount of the supporting force or counter torque respectively can correspondingly depend on the vibration, in particular its vibration amplitude and/or frequency, thus for example on an acceleration of the top of the tower or the like.

Additionally or alternatively, the counter torque braking the rotor is in one embodiment controlled on the basis of (a signal) of at least one vibration sensor which, in a further development, measures accelerations, or is configured or used thereto respectively, and/or is arranged at between 25% and 70%, in particular between 35% and 65%, in one embodiment between 40% and 60%, or between 70% and 100% of the tower height between the base and the very top of the tower and/or in or below a nacelle of the tower supporting the rotor.

In simplified terms, the tower can be considered a cantilever beam, or a bending beam fixed at one end respectively, with a tip mass in the form of the tower top, thus in particular the nacelle, its first natural (bending) mode exhibiting its maximum deflection at the top of the tower and its second natural (bending) mode exhibiting its maximum deflection in the tower center region.

Correspondingly, in one embodiment, vibrations, in particular a first or respectively second natural (bending) mode, or a lateral vibration of the tower transverse to the rotational axis of the rotor respectively, can be particularly advantageously detected and thus reduced or dampened in terms of control with the aid of such vibration sensors.

In general, the tower vibration which is reduced or respectively dampened in terms of control, or on the basis of which the counter torque is controlled, or for the reduction or, respectively, dampening of which the counter torque is controlled, in one embodiment modulated in terms of amplitude, phase and/or frequency, is a lateral vibration of the tower, in particular a first or second natural mode of the tower and/or transverse to a rotational axis of the rotor and/or tracking axis of the top of the tower.

The present invention can reduce or respectively dampen such vibrations in a particularly advantageous manner without the invention being limited thereto.

In one embodiment, the counter torque braking the rotor for maintaining a direction of a (resultant or respective total) torque driving the rotor is controlled such that, or respectively subject to a requirement that, a direction of rotation or a rotational direction of a (resultant or respective total) torque driving the rotor or respectively acting on the rotor does not change as a consequence of the control, in particular that a resultant torque or torsional moment acting in the drive train comprising the rotor and generator unit does not change its sign. In one embodiment, the amplitude of the torque modulation, or of the counter torque respectively, is to that end lower than the current and/or mean torque applied to, or respectively acting on, the rotor, in particular by more than 10%, in one embodiment by more than 15% lower, or respectively the counter torque braking the rotor is controlled in this way with the aid of the generator unit. In one very simple example, the counter torque can for instance also be reduced upon a reduction of the wind force-dependent or wind force-induced aerodynamic torque or rotor torque in order to maintain a direction of the total torque acting on or respectively driving the rotor, or the resultant torque or torsional moment acting in the drive train comprising the rotor and generator unit respectively, in terms of control.

As a result, gear rattle and/or hammering can in one embodiment be advantageously reduced or respectively prevented.

In one embodiment, the counter torque braking the rotor is also controlled in the first operating mode on the basis of a or the tower vibration, whereby here as well, stress caused by tower vibrations can advantageously be reduced, in particular thus in a partial or full-load operation of the wind turbine.

In one embodiment, a wind force-dependent rotation of the rotor is converted into electrical power in the second operating mode with the aid of the generator unit, which electrical power is used to adjust the rotor blade or blades about the (respective) blade setting axis and/or to supply loads of the wind turbine, in one embodiment thermal resistors and/or auxiliary units, and/or is output from the wind turbine into the electrical network and/or is stored, in particular by the counter torque braking the rotor being at least partially imparted or respectively induced by the generator unit or the generation of electrical power respectively.

In one embodiment, using at least part of the electrical power generated, in particular during or respectively by or for the controlling of the counter torque, to adjust the rotor blade or blades enables advantageously approaching the damping angular position or respectively also again approaching the operating angular position. Additionally or alternatively, the damping angular position can in one embodiment be adjusted to any potential significant changes in wind speed.

By at least some of the generated electrical power being delivered to the electrical network and/or stored, wind energy can in one embodiment also be used advantageously when the turbine is substantially in feathering position. Likewise, as explained above, in one embodiment, grid infeed can also be ended or respectively stopped in the second operating mode.

In one embodiment, using at least some of the generated electrical power to supply loads of the wind turbine enables the loads to be advantageously supplied and/or the counter torque advantageously controlled.

In one embodiment, said power which is output or respectively stored in the second operating mode amounts to at most 2%, in one embodiment at most 1%, of the wind turbine's rated output. Additionally or alternatively, in one embodiment, a rotational speed of the rotor in the second operating mode amounts to a maximum of 20%, in one embodiment a maximum of 10%, of the wind turbine's rated rotational speed.

Thus, one embodiment of the present invention is based on the idea of control-related vibration damping even in wind or respectively operating conditions in which the rotor blade or blades exhibit an approximate feathering position so that particularly the risk of damage is (further) minimized.

In one embodiment, the rotor or top of the tower respectively, thus in particular the nacelle, is adjusted or respectively rotated about the tracking axis in the first operating mode and/or second operating mode as a function of wind direction, in particular with respect to the tower body and/or such that the rotational axis of the rotor, oriented in particular from the rotor to the generator unit or nacelle respectively, forms an angle of at most 45°, in particular a maximum of 30°, in one embodiment a maximum of 15°, with the direction of the wind, in particular thus at least substantially parallel to the direction of the wind. In other words, in one embodiment, the rotor or top of the tower respectively, in particular thus the nacelle, is turned into the wind or respectively tracks its direction in the second operating mode.

In one embodiment, the drive for adjusting the rotor, or top of the tower respectively, in particular thus the nacelle, about the tracking axis in the second operating mode is supplied or respectively operated for this purpose with electrical energy which is generated with the aid of the generator unit for or respectively when controlling the counter torque.

According to one embodiment of the present invention, one or the controller for, in particular of, the wind turbine is configured, in particular in terms of hardware and/or software, in particular in terms of programming, to carry out a method as described herein and/or has:

a first operating mode or respectively means for implementing a first operating mode or for operating the wind turbine in a first operating mode respectively, in which the at least one rotor blade has an operating angular position about the blade setting axis and a wind force-dependent rotation of the rotor is converted into electrical power with the aid of a generator unit (40, 41), which electrical power is transferred from the wind turbine into an electrical network (52) and/or is stored; and a second operating mode or respectively means for implementing a second operating mode or for operating the wind turbine in a second operating mode respectively, in which the at least one rotor blade is adjusted by at least 60° and/or by a maximum of 110° about the blade setting axis relative to the operating angular position into a damping angular position, and a counter torque braking the rotor is controlled on the basis of a vibration of the tower.

In one embodiment, the controller, or its means respectively, comprises:

means for switching from the first into the second operating mode should a wind speed exceed a cut-off speed and/or should a malfunction be detected; and/or means for controlling the counter torque braking the rotor with the aid of the generator unit and/or on the basis of at least one vibration sensor (11) arranged in particular at between 25% and 70% or 70% and 100% of the tower height and/or in or below a nacelle of the tower supporting the rotor, and/or a lateral vibration of the tower, in particular a first or second natural mode of the tower and/or transverse to a rotational axis (R) of the rotor, and/or for maintaining a direction of a torque driving the rotor and/or also on the basis of a tower vibration in the first operating mode; and/or means for converting a wind force-dependent rotation of the rotor into electrical power in the second operating mode with the aid of the generator unit, and means for using this electrical power to adjust the at least one rotor blade about the blade setting axis and/or to supply loads of the wind turbine and/or to deliver said electrical power of the wind turbine into the electrical network and/or to store said electrical power; and/or means for adjusting the rotor about a tracking axis transverse to its rotational axis in the first and/or the second operating mode as a function of a wind direction.

Means in the sense of the present invention can be of hardware and/or software form, in particular a processing unit, in particular a digital processing unit, in particular a microprocessor unit, in particular at least one CPU, preferably in data or signal connection with a storage and/or bus system, and/or comprising one or more programs or program modules. The processing unit can be configured to process instructions implemented as a program stored in a storage system, acquire input signals from a data bus and/or output output signals to a data bus. A storage system can comprise one or more, in particular different storage media, in particular optical, magnetic, solid-state and/or other non-volatile media. The program can be such that it embodies, or respectively is capable of executing, the methods described herein such that the processing unit can carry out the steps of such methods and thus in particular control or respectively operate the wind turbine. In one embodiment, a computer program product can comprise, in particular be, a storage medium for storing a program, in particular a non-volatile storage medium for storing a program, or respectively have a program stored thereon, wherein executing said program causes a system or respectively a controller, in particular a computer, to carry out a method as described herein, or one or more of its steps, respectively.

In one embodiment, one or more, in particular all of the method steps is/are carried out completely or partly automatically, in particular by the controller or its means, respectively.

Figure 2:
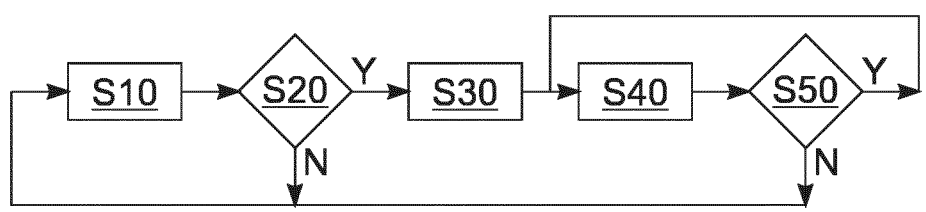

Further advantages and features will become apparent from the dependent claims and example embodiments. In the figures:

FIG. 1 shows, partially schematically, a wind turbine having a controller for operating the wind turbine according to an embodiment of the present invention; and FIG. 2 shows, partially schematically, a method for operating the wind turbine according to an embodiment of the present invention.

FIG. 1 shows a wind turbine with a controller 10 for operating the wind turbine according to an embodiment of the present invention which comprises a tower having a tower top in the form of a nacelle 20 and a tower body 21 on which the nacelle 20 is rotatable about a vertical tracking axis N by a drive 22 and can thus track a direction of wind as indicated in FIG. 1 by an arrow indicating adjustment. The controller 10 controls the drive 22 to that end, as indicated in FIG. 1 by a control arrow.

The tower (body 21) in the example embodiment is at sea, as indicated by a water surface W.

A rotor with rotor blades 30 is rotatably mounted in the nacelle 20 about a rotational axis R, as indicated in FIG. 1 by a rotation arrow.

The rotor blades 30 can each be rotated about their blade setting axis B, as indicated in FIG. 1 by arrows indicating adjustment. The controller 10 controls a blade adjustment drive to that end, as indicated in FIG. 1 by a control arrow.

The rotor is coupled to a generator 41 of a generator unit via a gearbox 40.

The controller 10 controls a counter torque braking the rotor which the generator 41 imparts when or respectively by converting a rotation of the rotor into electrical energy which is output to a load 50 and/or storage 51 and/or electrical network 52.

In a method for operating the wind turbine according to an embodiment of the present invention as illustrated in FIG. 2, the rotor blades are or respectively will be set to a pitch angle of approximately 0° in a step S10, or first operating mode in the form of partial load operation respectively, and a wind force-dependent rotation of the rotor is converted into electrical power with the aid of the generator unit 40, 41, which electrical power is then output from the wind turbine to the electrical network 52. In full-load operation, the rotor blades are operated with a variable blade pitch angle of between 0° and 45°.

Should a malfunction of the wind turbine or of the electrical network 52 or a wind speed above a preset cut-out (wind) speed be detected (S20: "Y"), the controller 10 switches into a second operating mode. The rotor blades are to that end rotated by approximately 84° to 94° about their blade setting axes toward the feathering position, i.e. their leading edges (left in FIG. 1) are rotated (in)to the oncoming (wind) flow (FIG. 2: S30). Otherwise (S20: "N"), the first operating mode is maintained, or a switch is made to a further operating mode (not illustrated).

In a step S40, or the second operating mode respectively, the counter torque imparted by the generator unit during or respectively through the generation of electrical energy is controlled or modulated such that a lateral vibration of the tower transverse to the rotational axis R and to the tracking axis N (perpendicular to the paper plane of FIG. 1) is reduced.

To that end, an acceleration sensor 11 detects a lateral acceleration of the top of the tower 20 and transmits a corresponding signal to the controller 10, as indicated in FIG. 1 by a signal arrow.

Based on this, the controller 10 determines an output variable which can for example be proportional to the lateral acceleration, in one embodiment a band-limited lateral acceleration, whereby the proportionality factor can for its part be dependent upon the amount of lateral acceleration, in one embodiment an asymmetrically ramp-limited and/or smoothed amount of lateral acceleration, in one embodiment in a linear or non-linear manner, and/or in a manner which is limited by an upper and/or lower limit. The 90° phase-shifted and potentially harmonized output variable forms a control variable which is used to control the counter torque imparted by the generator unit during or respectively through the generation of electrical energy, and which for example forms a target generator torque or which is superimposed to a desired target generator torque mean value.

In this context, the counter torque is controlled such that a torsional moment in the drive train comprising the rotor and the generator unit 40, 41 does not change its sign, in order to prevent rattle in the gearbox 40.

As long as the malfunction of the wind turbine or respectively the electrical network 52 or respectively a wind speed above a preset cut-out (wind) speed is detected (S50: "Y"), step S40, or respectively the second operating mode, continues to be carried out; otherwise (S50: "N"), the method or respectively the controller 10 or respectively the wind turbine reverts to step S10 or the first operating mode respectively.

Although example embodiments have been outlined in the preceding description, it is to be pointed out that a plurality of modifications are possible. It is also to be noted that the example embodiments are only examples that are not in any way intended to limit the scope of protection, the applications and the configuration. Rather, the preceding description provides a person skilled in the art with a guideline for the implementation of at least one example embodiment, whereby various modifications can be made, in particular as regards the function and arrangement of the described components, without departing from the scope of protection as provided by the claims and feature combinations equivalent thereto.

The invention claimed is:

1. A method for operating a wind turbine comprising a tower and a rotor arranged at the top of the tower which has at least one rotor blade adjustable about a blade setting axis,
    wherein in a first operating mode, the at least one rotor blade has an operating angular position about the blade setting axis and a wind force-dependent rotation of the rotor is converted with the aid of a generator unit into electrical power which is transferred from the wind turbine to an electrical network or stored; and
    wherein in a second operating mode, the at least one rotor blade is adjusted by at least 60° about the blade setting axis relative to the operating angular position into a damping angular position and a counter torque which is braking the rotor and which is imparted by or induced by the generator unit is controlled on the basis of a lateral vibration of the tower.

2. The method according to claim 1, wherein a switch is made from the first operating mode into the second operating mode should a wind speed exceed a cut-out speed or should a malfunction be detected.

3. The method according to claim 1, wherein a wind force-dependent rotation of the rotor is converted with the aid of the generator unit into electrical power in the second operating mode, wherein the electrical power is used to adjust the at least one rotor blade about the blade setting axis or to supply loads of the wind turbine, or is output from the wind turbine into the electrical network, or is stored,
    wherein said output or respectively stored power amounts to at most 2% of the wind turbine's rated output, or wherein a rotational speed of the rotor in the second operating mode amounts to a maximum of 20% of the wind turbine's rated rotational speed.

4. The method according to claim 1, wherein the tower is arranged in a body of water, or
    wherein the generator unit comprises a gearbox, or
    wherein the rotor comprises at least two rotor blades, each of the at least two rotor blades being adjustable about a respective blade setting axis, and having an operating angular position about their blade setting axis in the first operating mode, and each of the at least two rotor blades being adjusted by at least 60° about the blade setting axis relative to the operating angular position into a damping angular position in the second operating mode.

5. The method according to claim 1, wherein the at least one rotor blade is adjustable by at least 80° or by a maximum of 100° about the blade setting axis from the operating angular position into a feathering position in which the rotor converts an inflow of wind parallel to its rotational axis into a minimum rotational speed.

6. The method according to claim 1, wherein, in the first operating mode or the second operating mode, the rotor is adjusted about a tracking axis transverse to its rotational axis as a function of a wind direction.

7. A computer program product comprising a program code which is stored on a non-transitory computer-readable medium, for carrying out the method according to claim 1.

8. The method according to claim 1, wherein the counter torque which is braking the rotor is controlled on the basis of at least one vibration sensor.

9. The method according to claim 8, wherein the at least one vibration sensor is arranged at between 25% and 70% of the tower height.

10. The method according to claim 8, wherein the at least one vibration sensor is arranged at between 70% and 100% of the tower height.

11. The method according to claim 8, wherein the at least one vibration sensor is arranged in or below a nacelle of the tower supporting the rotor.

12. The method according to claim 1, wherein the lateral vibration of the tower is a first natural mode of the tower or a second natural mode of the tower.

13. The method according to claim 1, wherein the lateral vibration of the tower is transverse to a rotational axis of the rotor.

14. The method according to claim 1, wherein the counter torque which is braking the rotor is controlled for maintaining a direction of a torque driving the rotor.

15. The method according to claim 1, wherein the counter torque which is braking the rotor is controlled on the basis of a tower vibration in the first operating mode.

16. A controller for a wind turbine, wherein the wind turbine comprises a tower and a rotor arranged at the top of the tower which has at least one rotor blade adjustable about a blade setting axis, wherein the controller has:
    a first operating mode in which the at least one rotor blade has an operating angular position about the blade setting axis and a wind force-dependent rotation of the rotor is converted into electrical power with the aid of a generator unit, which electrical power is transferred from the wind turbine into an electrical network or is stored; and a second operating mode in which the at least one rotor blade is adjusted by at least 60° about the blade setting axis relative to the operating angular position into a damping angular position, and a counter torque which is braking the rotor and which is imparted by or induced by the generator unit is controlled on the basis of a lateral vibration of the tower.

17. A wind turbine comprising the controller of claim 16.

* * * * *